Sept. 15, 1964 L. H. HANNER 3,148,430
SOAP SAVER
Filed Jan. 4, 1963
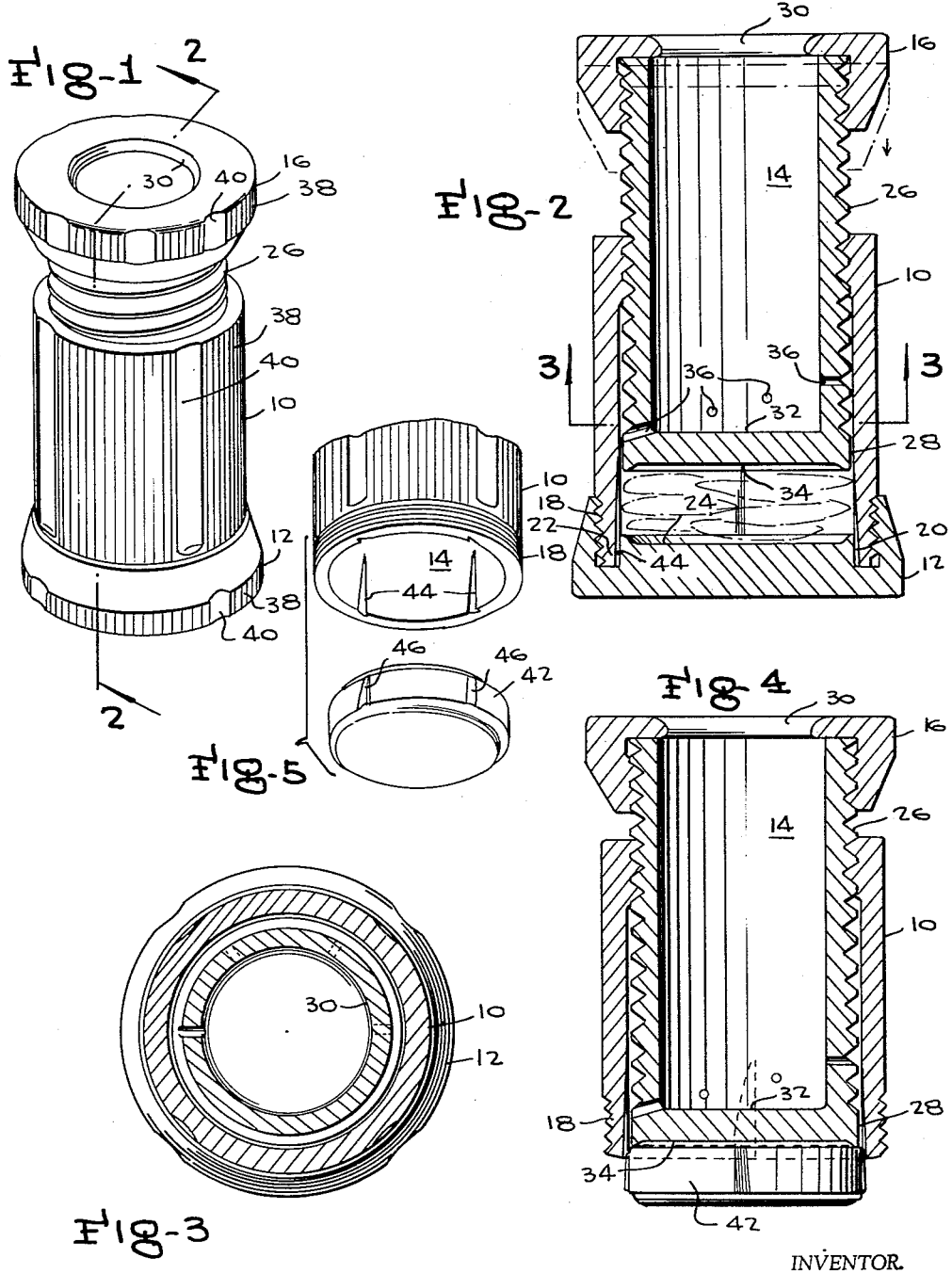
INVENTOR.
LESTER H. HANNER
BY
McMorrow, Berman + Davidson
ATTORNEYS 3,148,430
SOAP SAVER
Lester H. Hanner, Rte. 1, Norman, Ind.
Filed Jan. 4, 1963, Ser. No. 249,491
10 Claims. (Cl. 25—7)

This invention relates to a soap-saving device, and in particular to a molding device, for converting small, scrap pieces of soap, collectively, into a coherent mass, forming from them a new bar of soap, of reasonable and practical size.

It is a general object of the invention to provide a device of the character aforesaid, which shall be simple in structure, yet reliable in operation. Other objects are to provide a mold for soap scraps which is easy to manufacture, and low in cost, yet durable.

More particularly, it is an object to provide a soap mold having means for introduction of water during molding, so as to facilitate the molding process.

Yet another particular object is to provide a mold adapted for ready ejection of the molded product.

A still further object is to provide means for inhibiting rotation of the molded mass in the mold.

These and other ends, which will be apparent, are attained by the present invention, a preferred form of which is described in the following specification, as illustrated in the drawing, in which:

FIGURE 1 is a perspective view of an assembled mold. according to the invention, FIGURE 2 is an axial sectional view through the mold, taken on the plane of the line 2—2 of FIGURE 1, FIGURE 3 is a transverse, sectional view through the mold, taken on the plane of the line 3—3 of FIGURE 2, FIGURE 4 is a view similar to FIGURE 2, showing a stage of operation wherein the molded soap cake is being ejected, and FIGURE 5 is a bracketed fragmentary view, in perspective, of the lower part of the mold, showing the soap cake as fully ejected.

Referring to the drawing by characters of reference, there is shown a mold structure in four parts, comprising a main cylinder 10 with bottom cap 12, collectively constituting a cup, and an inner cylinder, or cup-shaped plunger 14 with open cap 16. At its lower end, the cylinder 10 has external threads 18, mating with internal threads on bottom cap 12, to retain the latter. Internally, the bottom cap 12 has a central, circular boss 20, defining an annular channel 22 which receives the lower, edge portion of cylinder 10. In its top face, the boss 20 has a dished cavity 24, with sloping side walls, the purpose of which is to impart a characteristic shape to the molded product, and which is, therefore, susceptible of variation in shape. The plunger 14 has external threads 26 throughout its length, except for a short length 28 at its lower end, and the cylinder 10 has internal threads for a short distance near its top to mate with threads 26 and thus provide telescopic movement between the plunger 14 and the cylinder 10. In this movement, the unthreaded portion 28 on the plunger limits its movement, in one direction, through the cylinder. Upper cap 16 is received on plunger threads 26 by means of mating, internal threads, and it will be seen that cap 16 limits retrograde movement of the plunger, back through the cylinder, and thus holds it captive. The cap 16, which has a central, circular opening 30, also provides leverage in the molding process, as will be seen.

The plunger 14 has a closed bottom 32, the outer face of which has a dished cavity 34, matching the cavity 24 in the boss of the bottom cap or closure 12. Starting at the bottom 32 of plunger 14, and arranged at increasing distances from the bottom, are a series of radial, wall bores 36, spaced peripherally about the plunger wall, and providing fluid access to the expansible molding chamber between bottom 32 and bottom closure 12.

Assuming the parts assembled, in the manner set forth above, use of the device simply involves removal of closure 12, introduction of the soap scraps within cylinder 10, adjusting plunger 14 to the extent required, replacement of closure 12, and turning of plunger 14, through the leverage of cap 16, to compress the soap chips into a single cake. The molding action is greatly facilitated by dropping a small quantity of water through opening 30, before initial compression, the water passing on through one or more of bores 36 into contact with the soap chips, and rendering them more tractable to molding.

For the molding effort, the grip on the parts is enhanced by providing finely-spaced, peripheral, corrugations or flutes 38, and also a lesser number of wider flutes 40.

After the wetting of the soap mass, the molding is accomplished by rotation of plunger 14. Any soapsuds generated in the compression will vent through bores 36, and at the conclusion of the molding, the mold may be turned upsidedown so that the water will drain through bores 36 and top opening 30, sufficient time being allowed for proper drainage. After drainage, the bottom closure 12 is unscrewed, and the formed cake of soap 42 is ejected by screwing plunger 14 down against it.

In order to hold the cake of soap against rotation during removal of the bottom closure, and during screwdown of the plunger, the inner wall of cylinder 10 is formed so that the molded cake of soap keys therewith. In the form shown in the drawings, this keying is provided by inwardly-projecting longitudinal ribs 44, preferably thicker at the bottom than at the top, which form grooves 46 in the peripheral edge of the soap. Other than the anti-rotation function, these grooves add to the appearance of the soap and improve its ease of handling.

While a certain, preferred embodiment has been shown and described, various modifications will be apparent, in the light of this disclosure, and the invention should not, therefore, be deemed as limited, except insofar as shall appear from the spirit and scope of the appended claims.

What is claimed is:

1. A molding device for conserving soap scraps, comprising a cylindrical tube having external threads near its lower edge, and internal threads near its upper edge, a bottom closure having internal threads received on said external threads, and having a raised, central boss with a dished cavity on its upper surface, and spaced from the internal threads on said closure to define an annular cavity, a cylindrical cup having a closed bottom, and having external threads mating with the internal threads in said tube, and running from the open, top edge of said cup to a point spaced from the lower edge thereof, said cup having a dished cavity in its lower face, and ports through its wall, spaced peripherally and longitudinally thereof in a region near said bottom, and a cap having a central opening, and internal threads mating with the external threads on said cup.

2. A device as in claim 1, said tube having inner longitudinally-extending ribs of varying depth, lengthwise.

3. A device as in claim 1, said tube having inner longitudinally-extending ribs.

4. A molding device for conserving soap scraps, comprising a cylindrical tube having external threads near its lower edge, and internal threads near its upper edge, a bottom closure having internal threads received on said external threads, and having a raised, central boss with a dished cavity on its upper surface, and spaced from the internal threads on said closure to define an annular cavity, a cylindrical cup having a closed bottom, and having external threads mating with the internal threads in said tube, and running from the open, top edge of said cup to a point spaced from the lower edge thereof, said cup having a dished cavity in its lower face, and ports through its wall, in a region near said bottom, and a cap having a central opening, and internal threads mating with the external threads on said cup.

5. A molding device for conserving soap scraps, comprising a cylindrical tube having external threads near its lower edge, and internal threads near its upper edge, a bottom closure having internal threads received on said external threads, and having a raised, central boss spaced from the internal threads on said closure to define an annular cavity, a cylindrical cup having a closed bottom, and having external threads mating with the internal threads in said tube, and running from the open, top edge of said cup to a point spaced from the lower edge thereof, said cup having ports through its wall, in a region near said bottom, and a cap having a central opening, and internal threads mating with the external threads on said cup.

6. A molding device for conserving soap scraps, comprising a cylindrical tube having external threads near its lower edge, and internal threads near its upper edge, a bottom closure having internal threads received on said external threads, a cylindrical cup having a closed bottom, and having external threads mating with the internal threads in said tube, and running from the open, top edge of said cup to a point spaced from the lower edge thereof, said cup having ports through its wall, in a region near said bottom, and a cap having a central opening, and internal threads mating with the external threads on said cup.

7. A molding device for conserving soap scraps, comprising a cylindrical tube having external threads near its lower edge, and internal threads near its upper edge, a bottom closure having internal threads received on said external threads, a cylindrical cup having a closed bottom, and having external threads mating with the internal threads in said tube, and running from the open, top edge of said cup to a point spaced from the lower edge thereof, and a cap having a central opening, and internal threads mating with the external threads on said cup.

8. A device as in claim 1, said tube, bottom closure and cap each having, externally, a series of closely-spaced flutes, and a series of widely-spaced flutes arranged longitudinally.

9. A molding device for soap scraps comprising a first cup with an outwardly removable bottom, a second cup with fixed bottom threadedly receivable in said first cup in telescoping relation, and a removable top cap on said second cup in the form of a ring-shaped, radially-outwardly-extending flange, and having a central opening.

10. A device as in claim 9, said second cup threadable in said first cup only through the bottom of said first cup.

References Cited in the file of this patent

UNITED STATES PATENTS

| | | |
|---|---|---|
| 2,486,347 | Walker | Oct. 25, 1949 |
| 2,955,530 | Nilo | Oct. 11, 1960 |
| 3,008,235 | Royer et al. | Nov. 14, 1961 |
| 3,082,682 | Kaufman | Mar. 26, 1963 |